United States Patent [19]

Eschbach

[11] Patent Number: 5,374,997
[45] Date of Patent: Dec. 20, 1994

[54] HIGH ADDRESSABILITY ERROR DIFFUSION WITH MINIMUM MARK SIZE

[75] Inventor: Reiner Eschbach, Webster, N.Y.

[73] Assignee: Xerox Corporation, Stamford, Conn.

[21] Appl. No.: 922,421

[22] Filed: Jul. 31, 1992

[51] Int. Cl.$^5$ .............................. H04N 1/40
[52] U.S. Cl. .................. 358/466; 358/447; 358/455; 358/448
[58] Field of Search .......... 358/455, 447, 463, 443, 358/456, 466–468, 448

[56] References Cited

U.S. PATENT DOCUMENTS

| | | | |
|---|---|---|---|
| 4,339,774 | 7/1982 | Temple | 358/283 |
| 4,654,721 | 3/1987 | Goertzel et al. | 358/283 |
| 4,924,322 | 5/1990 | Kurosawa et al. | 358/448 |
| 4,955,065 | 9/1990 | Ulichney | 382/50 |
| 5,025,322 | 6/1991 | Ng | 358/298 |
| 5,045,952 | 9/1991 | Eschbach | 358/447 |
| 5,221,971 | 6/1993 | Allen et al. | 358/459 |
| 5,274,472 | 12/1993 | Williams | 358/455 |

FOREIGN PATENT DOCUMENTS

90/09075 9/1990 WIPO .

OTHER PUBLICATIONS

An Adaptive Algorithm for Spatial Greyscale, Floyd and Steinberg, Proceedings of the SID, 17/2, 75–77 (1976).

A Survey of Techniques for the Display of Continuous Tone Pictures on Bilevel Displays, Jarvis et al, Computer Graphics and Image Processing, vol. 5, pp. 13–40 (1976).

MECCA–A Multiple-Error Correction Computation Algorithm for Bi-Level Image Hardcopy Reproduction, Stucki, IBM Research RZ1060 (1981).

On the Error Diffusion Technique for Electronic Halftoning, Billotet-Hoffmann et al., Proceedings of the SID, vol. 24/3 pp. 253–258 (1983).

Digital Halftoning on the IBM 4250 Printer, Goertzel et al, IBM J Res Develop, vol. 31, No. 1, Jan. 1987, pp. 2–15.

Primary Examiner—Bernard Roskoski
Attorney, Agent, or Firm—Mark Costello

[57] ABSTRACT

High addressability image signals, each representing a pixel in an image, where the signal has one of a relatively large number of signal levels, are directed through an error diffusion quantization process, for the conversion of the signal to one of a relatively small number of levels. Each signal is modified by a correspondingly weighted error correction term signal or signals from previously processed image signals, thereby generating a modified image signal. This modified image signal is compared to a threshold to derive a preliminary output signal having a smaller number of levels. The preliminary output signal is directed to an output if it has the same level as the previous output signal. If the preliminary output signal does not have the same level as the previous output signal, the preliminary output signal is directed to the output only if the previous output signal was one of a contiguous group of a preselected number of like level signals. Otherwise, the previous output value is directed to the output. The actual output signal is then compared to the modified input signal to derive an error signal for the diffusion feedback loop that maintains gray density.

6 Claims, 5 Drawing Sheets

HIGH ADDRESSABILITY ERROR DIFFUSION WITH MINIMUM MARK SIZE

This invention relates to quantizing high addressability gray image signals in a manner accommodating printing processes not adapted to printing single small marks, by causing the output to maintain a minimum spot size, while maintaining gray density.

BACKGROUND OF THE INVENTION

Image information, be it color or black and white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray or 256 colors are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce gray level image data to a limited number of levels so that it is printable. Besides gray level information derived by scanning, certain processing techniques such as those described, for example, in U.S. patent application Ser. No. 07/600,542, entitled, "Method for Making Image Conversions With Error Diffusion" by R. Eschbach, produce gray level pixel values which require conversion to a limited set of "legal" or output values.

In high addressability or pulse width modulation printing systems, in contrast to high resolution systems, fine spatial addressing is used in at least one direction (usually the cross process or fast scan direction) while still using a relatively coarse spot. Thus, a high resolution system might operate at 600×600 spi, with a spot that is 1/600×1/600 square inches. In contrast, a high addressability system might operate at 400×1600 spi, with a spot that is 1/400×1/400 square inches. Such a high addressability system can produce a spot or mark that is 1/400×1/400, 1/400×5/1600, 1/400×6/1600, 1/400×7/1600, etc. Such an arrangement is an improvement over a standard printer, which prints at 1/400×1/400, 1/400×2/400, 1/400×3/400, 1/400×4/400.

A process commonly referred to as error diffusion, which converts gray images to binary or other number of level images while attempting to preserve local optical density exist is taught, for example, in "An Adaptive Algorithm for Spatial Greyscale" by Floyd and Steinberg, Proceedings of the SID 17/2, 75–77(1976) (hereinafter, "Floyd and Steinberg"). Another, more elaborate method is taught in U.S. Pat. No. 5,045,952 to Eschbach, assigned to the same assignee as the present invention, which provides image dependent edge enhancement in an error diffusion process. Additional modifications to the error diffusion algorithm as taught by Floyd and Steinberg have been proposed, e.g.: a different weighting matrix, as taught, for example, in "A Survey of Techniques for the Display of Continuous Tone Pictures on Bilevel Displays" by Jarvis et., Computer Graphics and Image Processing, Vol. 5., pp.13–40 (1976), and in "MECCA - A Multiple-Error Correction Computation Algorithm for Bi-Level Image Hardcopy Reproduction" by Stucki, IBM Res. Rep. RZ1060 (1981). Modifications of the error calculation and weight allocation have been taught, for example, in U.S. Pat. No. 4,924,322 to Kurosawa et. al., U.S. Pat. No. 4,339,774 to Temple, and U.S. Pat. No. 4,955,065, to Ulichney. Other error diffusion methods include U.S. patent application Ser. No. 07/600,542, entitled "Method of Making Image Conversions with Error Diffusion" to Eschbach; Ser. No. 07/672,987, entitled "Method of Error Diffusion with Application of Multiple Error Diffusion Matrices" by Eschbach; Ser. No. 07/755,380, entitled "Method for Quantization of Gray Level Pixel Data with Application of Under Compensated Error Diffusion", by Eschbach et al., all assigned to the same assignee as the present invention. Another modification to the method of error diffusion was taught by Billotet-Hoffmann and Bryngdahl, Proceedings of the SID, Vol. 24/3, (1983), pp. 253–258 (hereinafter, Billotet-Hoffmann and Bryngdahl). A dither matrix is used as a repeating set of thresholds for error diffusion, to alleviate the problems of undesired patterns generally produced by the error diffusion algorithm. A distinct method using a dither matrix of large dynamic range together with an edge enhanced error diffusion algorithm is taught in U.S. patent application Ser. No. 07/800,811, entitled "Halftoning with Enhanced Dynamic Range and Edge Enhanced Error Diffusion" by Eschbach.

Error diffusion attempts to maintain gray by making the conversion from gray image signals to binary or other level image signals on a pixel-by-pixel basis. The procedure examines each image signal with respect to a threshold or set of thresholds, and a difference signal, representing the difference in optical density between the modified input image signal and output image signal is forwarded and added to a selected group or set of neighboring pixels, in accordance with a predetermined weighting scheme.

A problem noted with the use of the standard error diffusion algorithms for printing applications is the production of large numbers of isolated black and/or white pixels which are non-printable by many types of printers. The problem remains in high addressability printing. However, in high addressability printing, a large number of high addressability pixels in a scan line make up a spot the size of a single pixel in standard printing. Additionally, while the data may represent, for example, a small group of pixels interspersed with black and white high addressability pixels, the distinction will not be printed due to the overlapping nature of the high addressability pixels. Thus, information may become lost.

A method to overcome the printability problem of standard printing (non-high addressability printing) is taught by U.S. Pat. No. 4,654,721 to Goertzel, where a method is shown to convert a continuous tone image to a bilevel pixel image. The total error generated in one halftone cell is distributed to a predetermined number of adjacent halftone cells. In this way, printable images are generated, while the banding artifact is reduced, by alternating between fixed output dot patterns. Because of an inherent lack of partial dots in this process, evidenced as a loss in sharpness, edge detection and sharpening was included. See, also, "Digital Halftoning in the IBM 4250 Printer" by Goertzel et al. (Goertzel), IBM J. Res. Develop., Vol. 31, No. 1, January 1987. U.S. patent application Ser. No. 07/583,337 by Shiau, and Ser. No. 07/775,201 to Fan, teach the use of similar methods to reduce a continuous tone image to a multilevel pixel image with diffusion of error between adjacent cells. These methods are believed inadequate for high addressability printing.

SUMMARY OF THE INVENTION

In accordance with the invention, there is provided a quantizing method wherein a high addressability image signal defined at one of a large number of possible levels of optical density is redefined at one of a smaller number of levels of optical density, wherein a minimum number of image signals in a line always have the same optical density value.

In accordance with the invention, high addressability image signals, each representing a high addressability pixel in an image, where the signal has one of a relatively large number of signal levels, are directed through an error diffusion quantization process, for the conversion of the signal to one of a relatively small number of levels. Each signal is modified by a correspondingly weighted error correction term signal or signals from previously processed image signals, thereby generating a modified image signal. This modified image signal is compared to a threshold (or a number of thresholds or distance measures) to derive a preliminary output signal having a smaller number of levels. The preliminary output signal is directed to an output if it has the same level as the previous output signal. If the preliminary output signal does not have the same level as the previous output signal, the preliminary output signal is directed to the output only if the previous output signal was one of a contiguous group of a preselected number of like level signals. Otherwise, the previous output value is directed to the output. The actual output signal is then compared to the modified input signal to derive an error signal for the diffusion feedback loop that maintains gray density.

In accordance with another aspect of the invention, the previous method may be implemented by providing a counter, counting from 1 to N when enabled. Whenever N is reached, the counter directs an ENABLE signal to an output determinator. The output determinator produces an output signal equal to the value of the preliminary output signal when enabled. Upon detecting a transition change, the output determinator directs a COUNTER START signal to the counter to reset and begin counting. again, from 1 to N, assuming for simplicity that the number of required contiguous high addressability pixels is identical for all output states. Even though a transition might have occurred in the values of $B_{n,l}$, while the counter is counting from 1 to N, such transitions are ignored until the transition change is again enabled by the counter ENABLE input of the output determinator. However, the optical density errors resulting from ignoring the transitions are fed back to the image.

In accordance with another aspect of the invention, N may be varied in accordance with the level of the current set of output signals and the output process.

In accordance with another aspect of the invention, there is provided a method of preparing an image signal representing the optical density response of an image, for output to a high addressability output device, having a resolution of m spots per unit length and n spots per unit length, and an output spot size greater than $1/m \times 1/n$, the image defined at the steps comprising:

receiving at an input a high addressability image signal having a resolution of $m \times n$ and one of c levels, for printing at a high addressability output device having a resolution of $m \times n$ at one of d levels, where $c > d$; modifying the image signal to account for previous processing errors with an error correction signal or signals from previously processed image signals, thereby generating a modified image signal; producing a preliminary output signal that is one of d levels, responsive to the comparison of the modified image signal to a threshold signal; directing an output signal that is one of d values to a high addressability output device as a combined function of the preliminary output signal, an immediately preceding output signal, and a counted number of output signals since the last variation in an output signal from a current level; storing to an error term storage device an error signal that has a level equal to the difference between the output signal and the modified image signal, and determining an error correction signal or signals, as a weighted portion of the stored error signal, to be used in modifying at least one subsequent image signal.

The present invention as described prevents the occurrence single, isolated pixels, or marks that are below a minimum size for the printing process. Transitions occur between levels as required by the image, but only if the previous marks are large enough for the printing process. Error generated by this process is fed back to the image, so as to maintain gray density.

These and other aspects of the invention will become apparent from the following descriptions to illustrate a preferred embodiment of the invention read in conjunction with the accompanying drawings in which:

Figure 1:
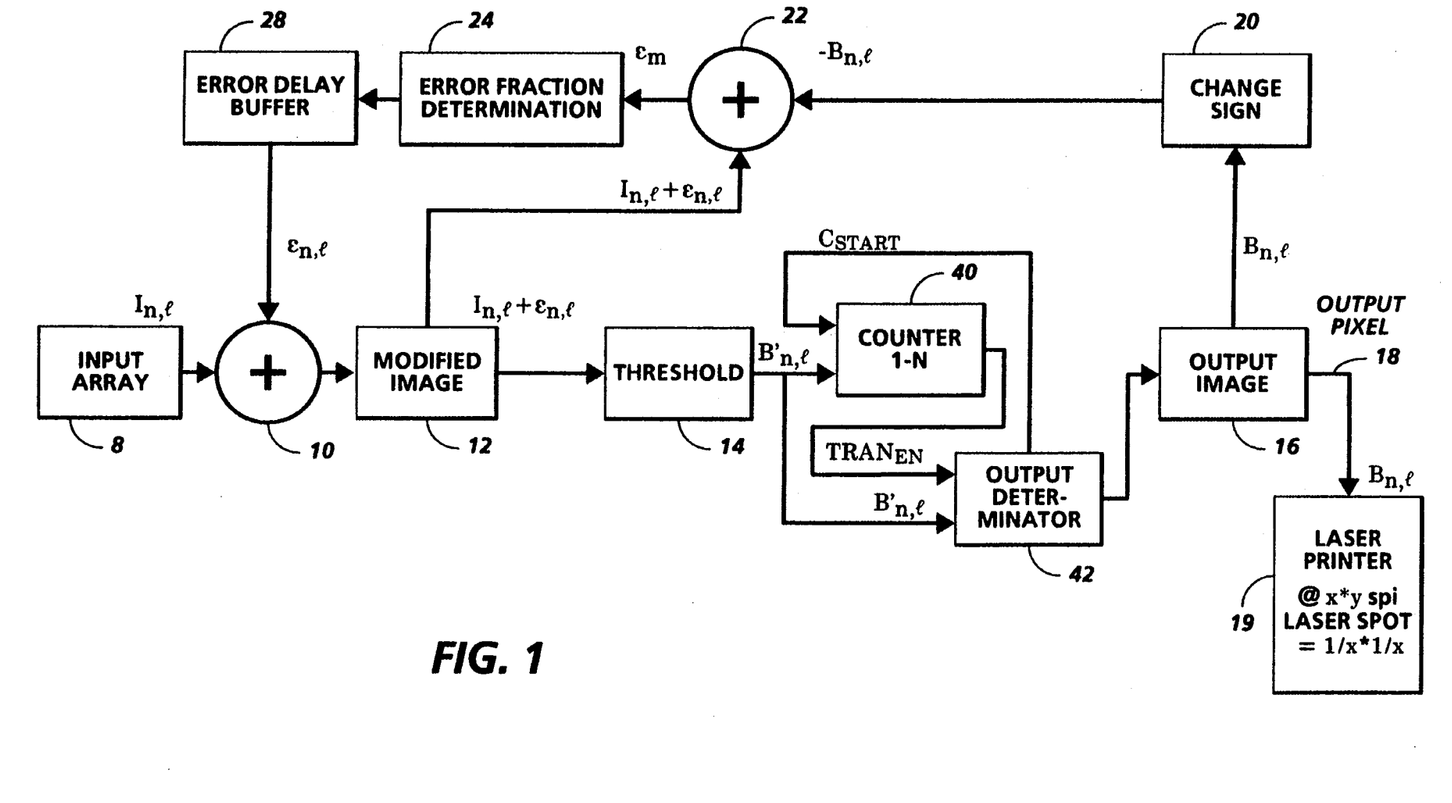
FIG. 1 is a block diagram of a basic system for carrying out the present invention.

Referring now to the drawings where the showings are for the purpose of describing an embodiment of the invention and not for limiting same, a basic system for carrying out the present invention is shown in FIG. 1. In the present case, gray level image signals from image input 8, each signal of which is defined at a single level or optical density In a set of optical density levels, the number of members in the set of levels being larger than desired for an output requirement. Each image signal will be processed in the manner described hereinbelow, to redefine the signal in terms of a new, smaller set of signal levels. Here, color images may be represented by image signals on number of independent channels or in separations which are handled independently, or the color image signals might be represented as vector data in a predefined color space, e.g.: RGB, CIELab etc., being submitted to vector operations in the thresholding, error calculation and correction. One common case of this method includes the conversion of data from a relatively large set of gray level signals to one of two legal or allowed bin values for printing with a binary printer. Another case of this is the conversion of data from a relatively large set of color data expressed as red, green and blue, or cyan, magenta, yellow and black, to one of five legal bin values for printing, as described in U.S. patent application Ser. No. 07/755,380, entitled "Method for Quantization of Gray Level Pixel Data with Application of Under Compensated Error Diffusion", by Eschbach et al.

As used herein, gray level signals refer to digital signals representing more than two levels of optical density within a discrete area of the image. Such signals should be contrasted with binary signals, which represent black or white, color or no color, in a discrete area of the Image.

The gray signals initially received at input 8 are high addressability image signals. In high addressability systems, in contrast to high resolution systems, fine spatial addressing is used in one direction (usually the cross process or fast scan direction) while still printing a relatively coarse spot. Thus, a high resolution system might operate at 600 ×600 spi, with a laser spot that is 1/600×1/600 square inches. In contrast, a high addressability system for an electrophotographic printer might operate at 400×1600 spi, with a laser spot that is 1/400×1/400 square inches. Such a high addressability system can produce a spot or mark that is 1/400×1/400, 1/400×5/1600, 1/400×6/1600, 1/400×7/1600, etc. Such an arrangement is an improvement over a standard printer, which prints at 1/400×1/400, 1/400 ×2/400, 1/400×3/400, 1/400×4/400. While high addressability printing systems are not limited to laser printers, such printers are the most common type of high addressability printing systems, as the systems take advantage of the inherent capability of modulating the laser in the cross. Process or fast scan direction with a high clock rate.

An input image of the type to be processed as hereinafter described may be represented by a set of gray signals (gray level pixels) arranged in an array of t lines, each line containing n gray signals. Gray signals are typically expressed as integer values representing a digital measurement of optical density, with one example falling in the range from 0 to 255, although greater or lesser number of levels, as well as non-integer representations, are possible. An output image is considered to consist of image signals, each image signal corresponding to an output element that is printed by a digital printer or display. In high addressability systems, the spots may overlap in the fast scan or cross process direction. Small spots, black or white, surrounded respectively by white or black pixels, are difficult to print with electrophotographic devices.

With reference to FIG. 1, a stored array of input image signals 8, which may be from any image, including scanned images or computer generated representations, directs input image I into the system on a signal by signal basis, where n,l represents the position of a single signal $I_{n,l}$ in a stream of image signals. $I_{n,l}$ refers in this description to both the signal that is positioned at n,l in the image signal stream, and the optical intensity or density of the image signal at position n,l. Each input signal has a corresponding error correction signal e added to the image signal $I_{n,l}$ at adder 10, where $\epsilon_{n,l}$ is a sum of weighted error term signals of previous pixels to be added to $I_{n,l}$, resulting in a modified image signal, temporarily stored at block 12. The modified image signal, the sum of the input image signals and the error correction signal of previous pixels ($I_{n,l}+\epsilon_{n,l}$), is passed to threshold comparator 14. The modified image signal is compared to threshold $T_{n,l}$ to determine an appropriate output signal $B_{n,l}$ for pixel $I_{n,l}$, such as, for example, in a binary output image, a spot or no spot. $T_{n,l}$ may vary in accordance with a dither pattern, or an edge enhancement scheme, or other threshold varying scheme. Once output signal $B_{n,l}$ is determined, as will be further explained hereinafter, the image signal is directed to output image storage 16 for eventual transfer to a print buffer or the like along line 18. The value of signal $B_{n,l}$ is subtracted from the modified image signal ($I_{n,l}+\epsilon_{n,l}$) to generate an error term signal $\epsilon_m$ from signal $I_{n,l}$. The subtraction operation is represented by the change sign block 20 and subsequent adder 22, with error term signal $\epsilon_m$ representing the difference between the modified image signal ($I_{n,l}+\epsilon_{n,l}$) and the output signal $B_{n,l}$ stored to error fraction determination block 24, where weighted portions of error term $\epsilon_m$ are calculated, and will be used for updating the error delay buffer 28.

In accordance with the invention, to determine $B_{n,l}$ after thresholding, preliminary output signals $B'_{n,l}$ are directed to counter 40, which, when enabled, counts from 1 to a selected number N. Upon reaching N, counter 40 generates an enable signal $TRAN_{EN}$ for the output determinator 42. When enabled, output determinator 42 relays the preliminary output signal $B'_{n,l}$ a to output image storage 16. In doing so, output determinator 42 compares each pixel with its predecessor to determine whether a transition from one level to another has occurred. In a binary system, a transition occurs when image signal $B'_{n,l}$ changes from a first state, represented by 1 or ON, to a second state, represented by 0 or OFF, and vice versa. Upon detecting transition from first to second state in its enabled state, output determinator 42 generates a counter start signal $C_{START}$ to start counter 40 counting from 1-N, thereby disabling the output determinator input TRANEN. The output of output determinator 42 is now maintained at a second state until the counter 40 enabled the input $TRAN_{EN}$ and a transition is detected in $B'_{n,l}$, whereupon, the output is changed and a start signal is sent to the counter. The output of output determinator is connected to output image storage 16 for eventual transfer to a print buffer along line 18. It will be appreciated that, conveniently, at the beginning of an image, the state may be set to 0 or OFF at the output determinator, and the counter may start counting from an enabled condition.

It should be noted that in the above example the same number of contiguous high addressability pixels was assumed for all output states. In actual implementations this might change to different numbers, e.g.: $N_O$ and $N_1$ for the binary or $N_i$ with $0 \leq i <$ number of possible output states.

Value N is selected based on minimum desired spot size, and may reflect the printing process used. Thus, for example, if a minimum spot size of 2 pixels is required in a K×K standard process, N in a similar high addressability operating at K×4K system will reflect that size, N will be 8. In general, however, the number N will not correspond to an integer number of pixels in the standard resolution. In one possible embodiment, the value of N may be different for white pixels and black pixels. Thus, in the given example, N may be 8 for black pixels, and 6 for white pixels.

Figure 2:
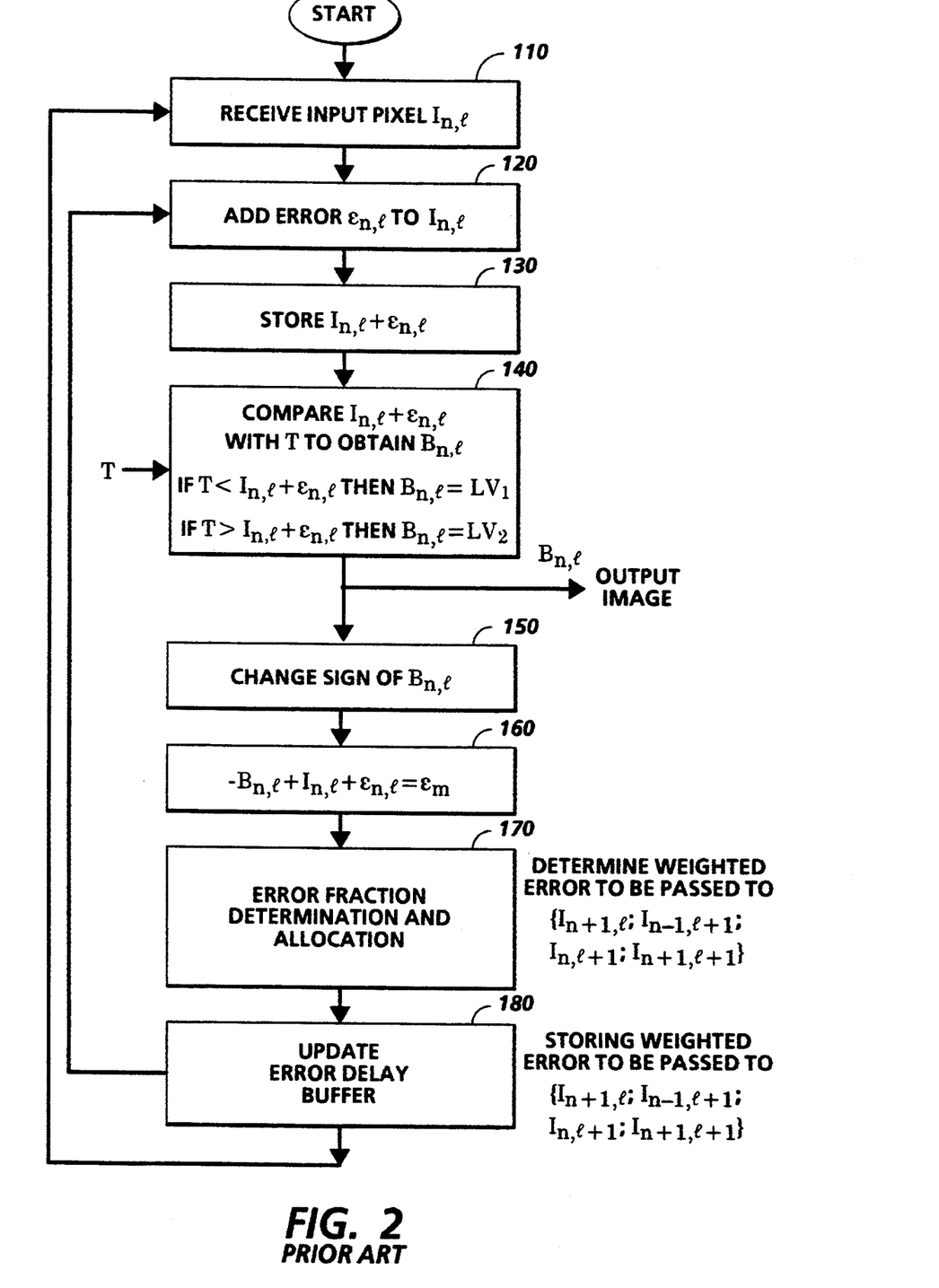
FIG. 2 is a flow chart showing the sequence of operations in the prior art.

With reference now to FIG. 2, there is shown a flow chart demonstrating the steps for quantizing pixel values in an image formed by a plurality of pixels, each pixel representing an optical density of the image at a location within the image, and having an original optical density associated therewith selected from one of a set of c original optical density values that has a number of members larger than a desired output set of d optical density values, where steps 110, 120, 130, 140, 150, 160,

170 and 180 are a standard error diffusion method to obtain a binary image output from gray image input of: 110) receiving an image signal having a gray value $I_{n,l}$; 120) adding an error term $\epsilon_{n,l}$ from the error delay buffer to the image signal $I_{n,l}$; 130) storing the image signal $I_{n,l}+\epsilon_{n,l}$ as a modified image signal; 140) thresholding the modified image signal against with signal $T_{n,l}$ to obtain a preliminary output signal $B'_{n,l}$ and directing $B_{n,l}$ to the output, where the threshold $T_{n,l}$ can be a constant or varying according to one of the mentioned schemes; 150) changing the sign or polarity of output signal $B_{n,l}$; 160) adding signals $-B_{n,l}$ to $I_{n,l}+\epsilon_{n,l}$ to obtain quantizing error $\epsilon_m$, 170) determining the weighted error for each of the currently unprocessed pixels to which error in the quantization of image signal $I_{n,l}$ is to be directed, and 180) updating an error storage or buffer holding the errors that are added to the future pixels at step 120. Here, the unprocessed pixel set $\{I_{n+1,l}, I_{n-1,l+1}, I_{n,l+1}, I_{n+1,l+1}\}$ shown associated with steps 170 and 180 is a common set for error diffusion, but other sets are also possible and are intended to be included in this description.

Figure 3A:
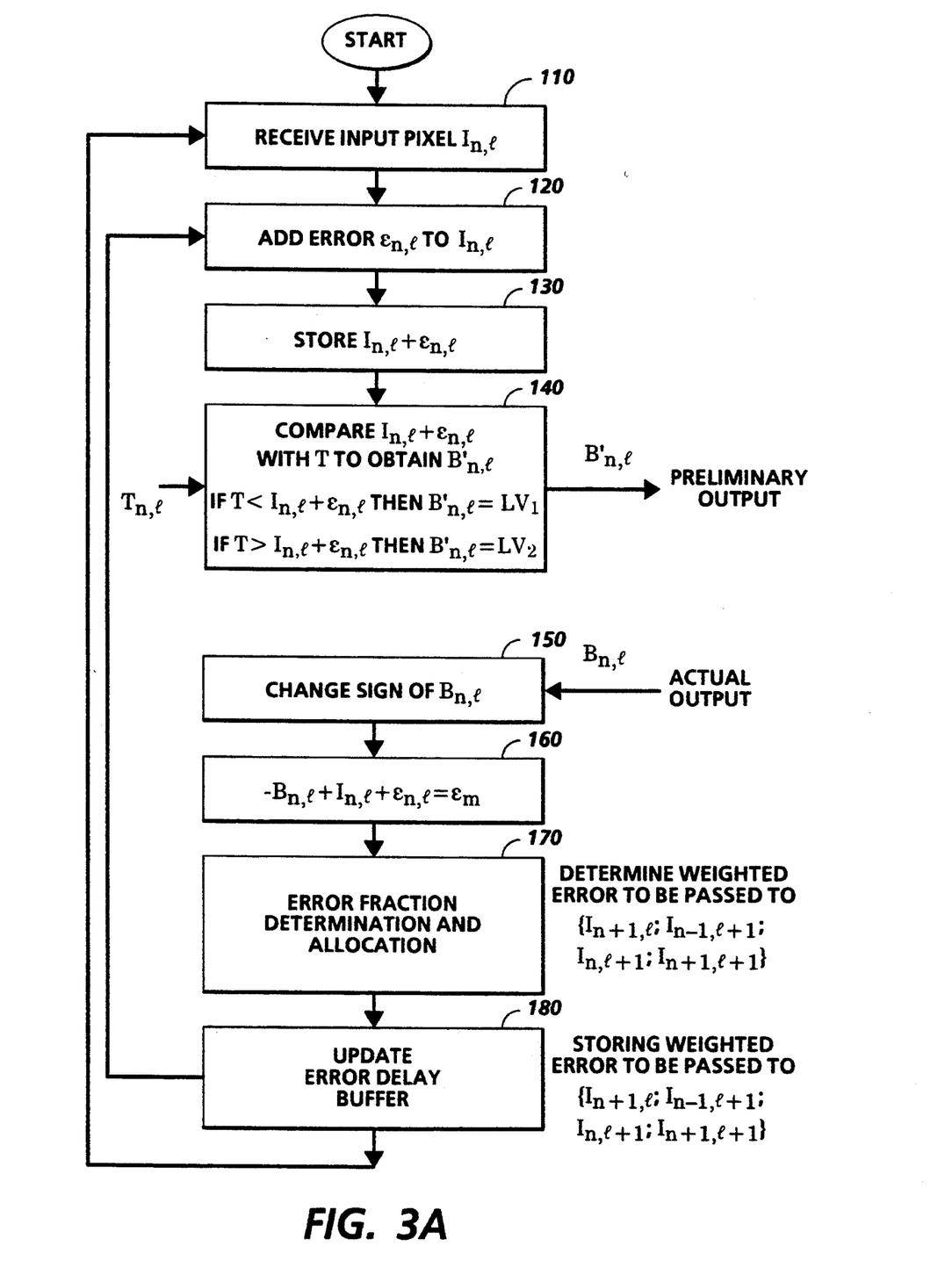
FIGS. 3A, 3B and 3C together form a flow chart showing the sequence of operations accomplishing the invention.
Figure 3B:
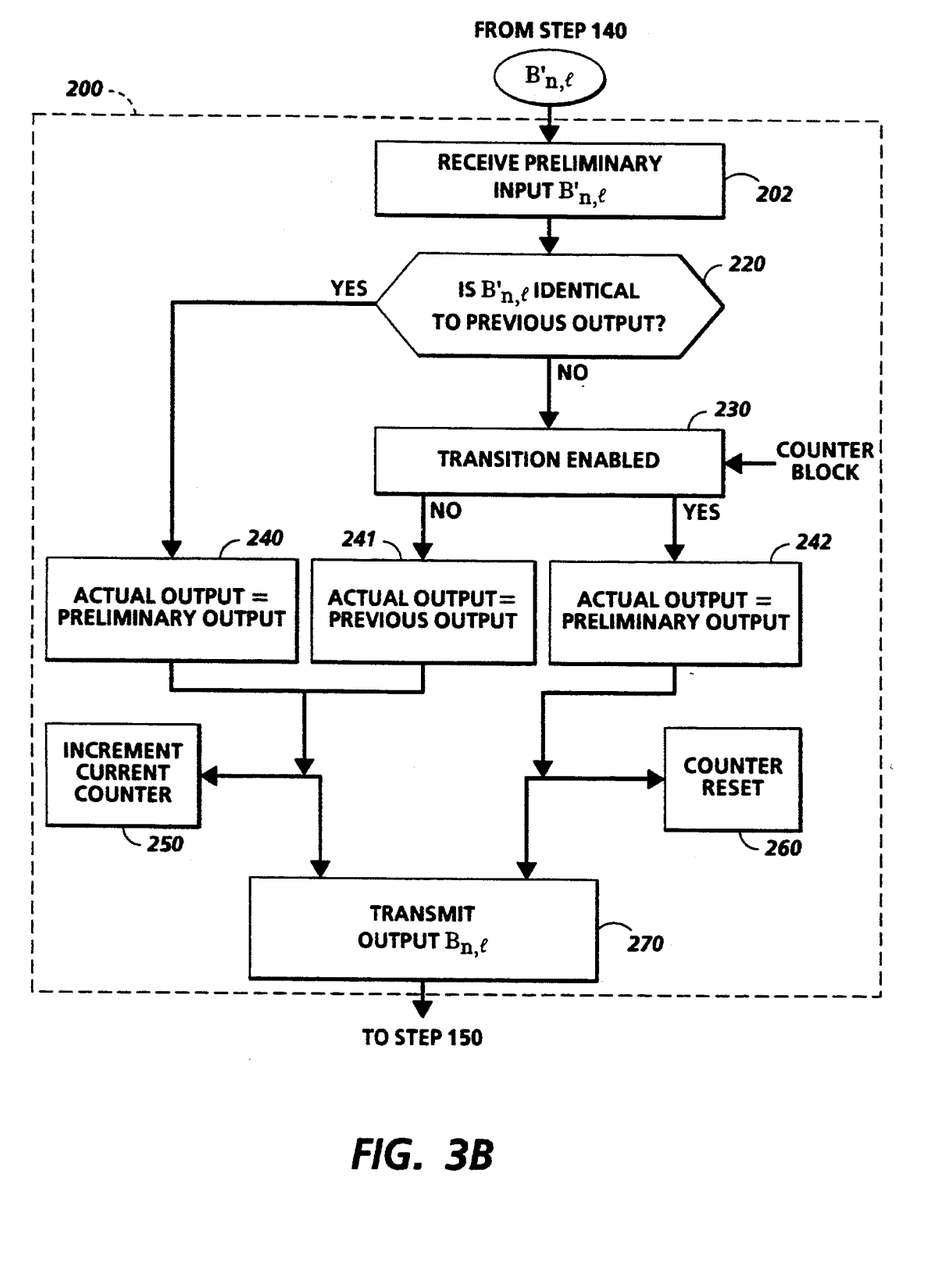
Figure 3C:
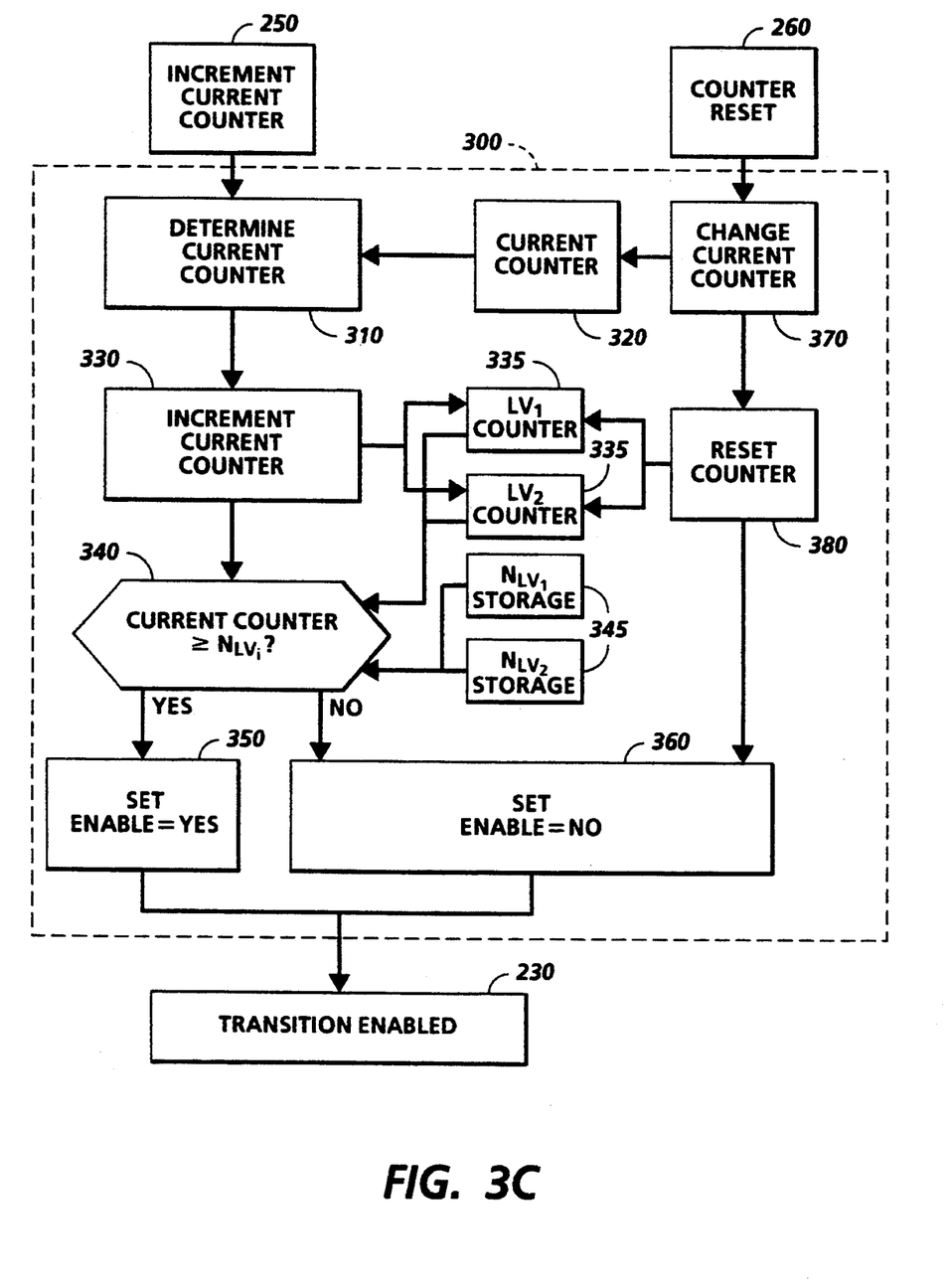

In accordance with the invention, and shown in FIG. 3A-C, step 140 and step 150 of FIG. 3A are separated and the output of step 140 is relayed as preliminary output signal $B'_{n,l}$ to output determination step 200 shown in FIG. 3B, at step 202. It will be noted that in the example that the signal $B'_{n,l}$ is either 1 or 0, the two members of the binary set of output values. At step 220, if the preliminary output signal is identical to the previous output signal, the actual output is set identical to the preliminary output at step 240. Subsequently the current state counter is incremented at step 250 and the actual output is relayed to step 270 to be incorporated in the computation of step 150 in FIG. 3A. If a transition occurred at step 220, then step 230 determines whether transition is enabled from counter step 300 shown in FIG. 3C. On finding that a transition is disabled, the actual output is set to the previous output at step 241. The current state counter is again incremented at step 250 and the actual output is relayed to step 270 for subsequent use by step 150. If a transition was enabled by counter step 300 at step 230, the actual output is set to the preliminary output at step 242, the counter for the state after the transition is stared at step 260 and the actual output is again relayed to step 270. FIG. 3C shows an embodiment of the counter step 300 with inputs "increment current counter" from 250 and "counter reset" from step 260. On receiving an input at step 250, the current counter is determined at step 320 through current counter memory 320. Step 330 increments the current counter LV1 or LV2 counters 335. Step 340 compares the current counter value with the minimum number NLVi of contiguous high addressability pixels required for same state and step 350 sets the transition enable flag to "YES" if the minimum number stored in NLVi storage 345 is reached. Otherwise step 360 sets the transition enable flag to "NO". On receiving a counter reset signal at step 260, the change current counter step 370 changes the state of the current counter memory 320. Additionally the counter LVi is set to its start condition by reset counter block 380 and the transition enable flag is set to "NO" at step 360. The transition enable flag serves as input to transition enabled step 230 of FIG. 3B.

The invention has been described with reference to a particular embodiment. Modifications and alterations will occur to others upon reading and understanding this specification. It should be noted that the use of the term "thresholding" throughout this invention is meant to encompass other ways of making a selection of the output optical density value.

I claim:

1. A method of preparing a set of high addressability image signals, representing the optical density of an image, for reproduction with a high addressability output device, said output device operating at a resolution on m spots per unit length in a first direction and n spots per unit length in a second direction perpendicular to the first direction, and having an output spot size greater than $1/m \times 1/n$, the steps comprising:

receiving at an input each high addressability image signal in the set thereof, prepared for reproduction having a resolution of $m \times n$ and with a possible optical density levels, where $c > 2$, for printing at a high addressability output device having a resolution of $m \times n$ with do possible optical density levels, where $a > d$, where $d > 1$;

producing a preliminary output signal that is one of said d possible optical density levels, responsive to a comparison of each high addressability image signal to a threshold signal from a threshold signal source;

producing a final output signal in response to the level of the preliminary output signal, the level of any immediately preceding final output signal, and a counted number of final output signals since the last variation in optical density level in a final output signal from a current optical density level, wherein said final output signal is one of said possible optical density levels printable at a high addressability output device;

storing to an error term storage device, an error signal that has a level equal to the difference between the final output signal and the high addressability image signal; and determining an error correction signal or signals, as a weighted portion of the stored error signal, to be used in modifying at least one subsequent high addressability image signal in the set thereof, prior to any other operation thereon.

2. The method as defined in claim 1, wherein the step of producing a final output signal that is one of density possible optical density levels for a high addressability output device responsive to the level of the preliminary output signal, the level of any immediately preceding final output signal, and a counted number of final output signals since the last variation in optical density level in a final output signal from a current optical density level includes:

comparing the current optical density level of the preliminary output signal with the optical density level of any immediately preceding final output signal;

comparing the counted number, incremented for each final output signal since the last variation in a final output signal from a current optical density level, to a selected number N;

directing the preliminary output signal to the high addressability output printer as the final output signal if the preliminary output signal is equal to the immediately preceding final output signal or if the counted number is equal to or greater than N; and directing a final output signal that is the same as the immediately preceding output signal to the high addressability output printer if the preliminary output signal is not equal to the last output signal and the counted number is less than N.

3. The method as defined in claim 1, wherein the selected number N varies in accordance with the current level.

4. An apparatus for preparing high addressability image signals representing the optical density of an image, for output to a high addressability output device operating at a resolution of me × no spots per unit length with an output spot size greater than am × 1/no. comprising;

an input to which a high addressability image signal is directed, said high addressability image signal prepared for reproduction at a resolution of m × n, and one of c possible optical density levels, where c > 2, for printing at a high addressability printer operating to reproduce images at a resolution of m × n and with d possible optical density levels, where c > d > 1 a thresholding comparator comparing the high addressability image signal to at least one threshold signal directed to the thresholding comparator from a threshold signal source and providing a preliminary output signal at one of said d optical density levels responsive to said comparison means for producing a final output signal responsive to the level of the preliminary output signal, a level of any immediately preceding final output signal, and a counted number of final output signals since the last variation in a final output signal from a current optical density level, wherein said final output signal is one said d possible optical density levels printable at a high addressability output device; and an error diffusion feedback arrangement including:
      a signal inverter connected to said final output signal producing means, changing the polarity of the final output signal for the error feedback arrangement, an error adder, connected to the signal inverter and the signal adder, and determining the difference between the changed polarity signal output signal and the high addressability image signal, means for generating at least one error correction signal, connected to the error adder, said error correction signal generated as a weighted portion of the error signal, and an error delay buffer, storing error correction signals for subsequent direction to a signal adder;

a signal adder, receiving error correction signals and adding said error correction signals to each subsequent high addressability image signal in the set thereof, prior to any other operation thereon after receipt at the input.

5. The apparatus as defined in claim 4, wherein said means for producing a final output signal that is one of d possible optical density levels to the high addressability output printer includes:

a 1- N counter, counting from 1-N for each image signal directed thereto upon receiving an enable signal, and generating a control signal responsive to reaching N;

an output determinator, detecting transitions between levels in successive preliminary output signals upon receiving a control signal from said 1-N counter, and generating the enable signal to said 1-N counter upon detecting a transition, said output determinator connected to and repeating a preceding output signal when the 1-N counter is enabled, and directing the preliminary output value to said high addressability output device and said signal inverter when the 1-N counter is not enabled.

6. The apparatus as defined in claim 5, wherein the selected number N varies in accordance with the current level.

* * * * *